Nov. 19, 1968  L. M. HUFF  3,411,186
SHOE LAST
Filed Sept. 23, 1966

INVENTOR
LIONEL M. HUFF
BY
Kane, Dalsimer, Kane & Smith
ATTORNEYS

United States Patent Office 3,411,186
Patented Nov. 19, 1968

3,411,186
SHOE LAST
Lionel M. Huff, Johnson City, N.Y., assignor to Endicott Johnson Corporation, Endicott, N. Y., a corporation of New York
Filed Sept. 23, 1966, Ser. No. 581,497
4 Claims. (Cl. 18—46)

The present invention relates to an improved last for use in the making of shoes, such as athletic shoes, by injection molding procedures.

Molding machines having a last member generally subject a preformed part of a shoe or shoe upper to various operations that are carried out at a plurality of stations. For example, the shoe upper may be placed and secured in proper orientation on the last at one station and sequentially moved through a series of stations during which time a shoe lower is gradually fabricated by injection molding procedures and joined to the shoe upper thereby forming a finished product.

The general construction and operation of a machine of the foregoing type is well known in the art. Further, since the specific details of the molding machine do not form a part of the present invention a full discussion is deemed to be unnecessary. However, reference will be directed thereto when specifically setting forth the construction of the improved last member and its operation as a part of the machine and particularly in connection with the mold structure as schematically shown in the figures.

The shoe lower is conventionally fabricated from, for example, either a thermoplastic resin, such as polyvinylchloride, or synthetic rubber and it is not at all uncommon that various types of one or the other material are employed at various stations. In other words, a portion of the shoe lower, of one color resin, may be injected at the initial station and the remainder of the lower, of a second color resin, may be injected and laminated to the former at a subsequent station thereby forming the entire shoe lower. More specifically, in the production of athletic shoes it is aesthetically more pleasing to provide a thermoplastic side band (foxing) that joins the shoe lower to the conventional white shoe upper yet the consuming public desires that the bottom of the lower be formed of a different color resin. Therefore, it is necessary to provide for the injection of multiple colors in the formation or fabrication of the shoe lower.

Usually this is carried out by injecting a portion of the shoe lower and the entire side foxing at a first station and after one or more cooling stations, injecting the second color resin, usually amber. Thus, at this first station the partial shoe lower is connected, by the foxing, to the upper. As may be appreciated the cooling allows the first injected resin to pass from the liquid or semiliquid state to a partially jelled state so that a second injection may be made. Regardless of the jelling of the initially injected material, the second material to be injected, being at a significant higher temperature, causes a thin layer of the first material to return to a semi-liquid state in the area of the junction of materials and thus, upon rejelling and setting, a proper and secure lamination of the materials is obtained.

With the advent or the conversion within the industry to high speed injection molding procedures and the consumer demand for multicolored shoe lowers several problems have arisen. Most importantly it has been found necessary to reduce the speed with which the machine rotates between stations, thereby cutting production capability. This has become necessary for the production of a commercial item. Specifically the speed must be reduced so that the resinous material injected at an initial station is permitted to jell to a point such that the resinous material injected at a subsequent station does not push on the former causing an intermingling of resins but rather laminates to the former at the junction between resins. With present machines operated under high speeds and with lasts being heated to require temperatures to insure a proper bond between lower and upper the problem of intermingling is of paramount concern.

The tendency for the resinous materials to intermingle rather than laminate at their junction prevails since the entire last member must be generally heated to a temperature which is required for the foxing to completely penetrate into the shoe upper thereby to secure the upper to the lower. This temperature is in excess of the temperature required for proper lamination of the injected resinous materials and therefore, unless the speed of the machine is slowed in its movement between stations the resin is not cooled to a temperature at which a jelling or partial jelling occurs. Thus, unless the rotation of the machine is such that the resin has time to cool the second injection of resinous material pushes on the former, causing the intermingling of materials and an unsatisfactory finished product. While this problem is particularly evident in the production of larger size athletic shoes it is also evident, to a lesser degree, in the production of smaller size shoes.

It is therefore an object of the present invention to overcome the foregoing disadvantages in the production of athletic shoes by high speed injection molding procedures by providing an improved shoe last member which is internally heated and portions of which are maintained at various temperatures.

Other objects and advantages of the present invention will become clear to those skilled in the art as the following description is developed.

In a broad sense the invention is directed to a movable shoe last capable of use with a molding machine provided with a mold that generally includes a two piece side, a sole plate and a toe plate all of which are used in the fabrication of a shoe lower and its joinder to a shoe upper. The shoe last is provided with a heating element disposed therein so as to be internally heated thereby. The last is in the form of a support having a toe, heel and ankle portion on which the shoe upper is supportingly received and consequently moved with the last into a cavity formed by the mold structure when the latter is moved into an operative molding position. Means in the form of an insulating sheet is disposed within the last and positioned between the heating element and the bottom surface of the last thereby to isolate the heating element from the last bottom and divide the last into an upper section and a lower section which is maintained at a temperature substantially lower than the temperature attained by the upper section.

The accompanying drawing illustrates a preferred embodiment of the present invention. By these drawings.

Figure 1:
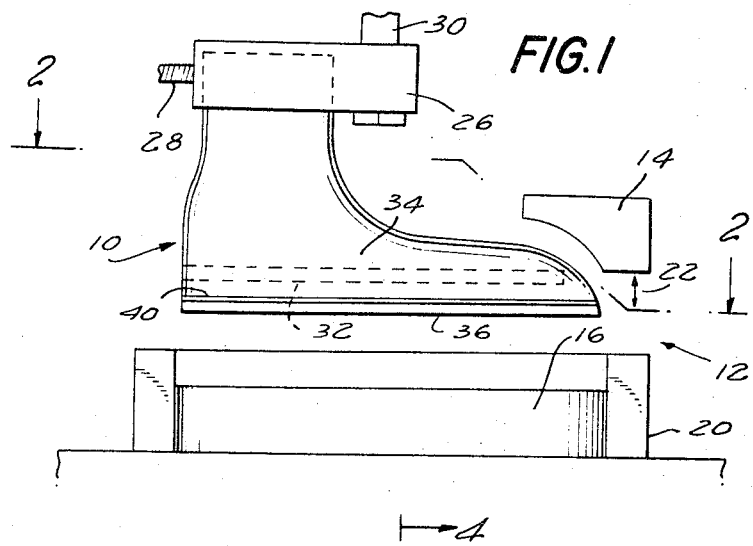
FIGURE 1 is an elevational view of the shoe last structure and a schematic representation of the mold structure.

In the figures the improved shoe last is generally denoted by the numeral 10 and the mold structure by the numeral 12. The mold generally includes a toe plate 14, a sole plate 16 (FIG. 4) and a pair of side plates 18 and 20.

The side molds 18 and 20 are mounted and arranged so that they are capable of moving in a horizontal plane and the toe mold section, as shown by the arrow 22 (FIG. 1) is capable of movement in a vertical plane so as to form a cavity in which the last is received during an injection of resinous material. The movement of the side plates is noted by the arrows 24 in FIG. 2. As noted above, the construction and operation of the molding apparatus is well known in the art and further discussion is deemed to be unnecessary.

Figure 2:
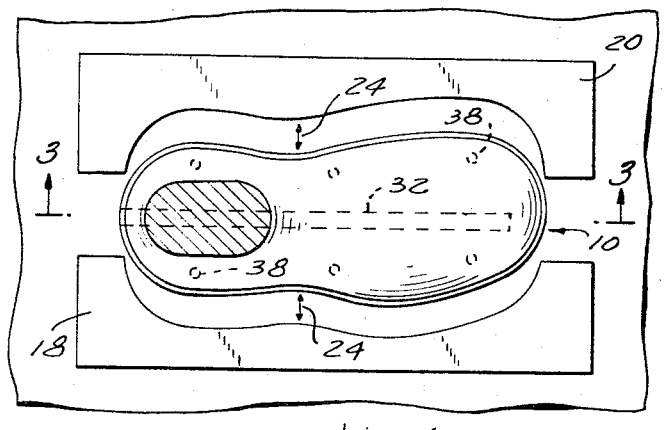
FIGURE 2 is a view of the last and mold structure as seen along the line 2—2 in FIG. 1.

As shown in FIG. 1 the shoe last 10 which may be formed of aluminum or any other suitable material which can withstand the hereinafter indicated temperature is received at an upper ankle portion within a channeled bracket member 26. The last may be secured to the bracket in any manner, for example by provision of a plurality of belts (not shown) which pass through the bracket and bind against the ankle portion of the last 10.

A rod 30 that is rigidly mounted on the bracket 26 connects the bracket to integral parts of the molding apparatus (not shown) so that the bracket and the attached last may be moved in and out of the molding cavity, as discussed above.

Figure 3:
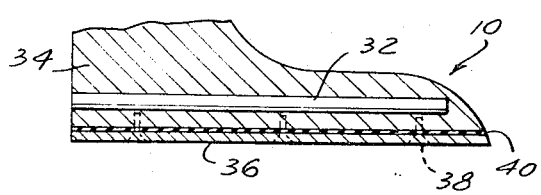
FIGURE 3 is a partial vertical section of the improved shoe last.

The last may best be seen in FIG. 3 and is provided with an electric heating element 32 of the Calrod type that is inserted within an opening, formed in the last, of approximately 1 inch in diameter. The opening is disposed in a plane which is horizontal to the bottom surface of the last and generally traverses the length of the last from the heel to the toe portion. The heating element is electrically connected to the cable 28 (FIG. 1) which, in turn, connects the element to an external control.

As specifically shown in FIG. 3 the last is in two sections, namely an upper section 34 and a lower section 36, of approximately one quarter of an inch in thickness. The sections are joined by a plurality of countersunk screws 38 and securely position therebetween a layer of heat insulation 40, to be discussed in greater detail.

Figure 4:
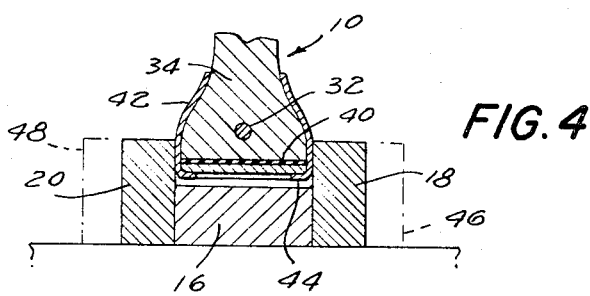
FIGURE 4 is a view in vertical section as seen along the line 4—4 in FIG. 2.

Turning now to FIG. 4 the last 10, carrying a shoe upper 42, is shown disposed within the cavity formed by the movable mold structure. The shoe upper is supported upon the last in any convenient fashion, such as by the provision of a tightening string at the bottom portion 44 of the upper. The string may be tightened when the upper is received on the last so that the upper forms itself around the bottom portion of the last. By means (not shown) passing through one or more of the eyelets in the shoe upper and functioning as a shoe last the upper may be maintained in a taut position on the last, as shown in the figure.

The insulating material 40 may be of any substance which provides high heat insulation, such as a substance sold by the General Electric Company under the tradename Lexan (referring generally to an aromatic polycarbonate resin), poly-phenylene oxide, mica, fiber glass, asbestos, etc. Good results have been obtained through the use of Lexan and this material is preferred.

FIG. 4 generally shows the assembly immediately prior to the first injection operation. Thus, the shoe upper has been secured on the last and the last is situated in the molding cavity as defined by the sectional ring mold 18 and 20. As noted in the figure the cavity is formed by moving the ring mold sections from the dotted line position indicated by the numerals 46 and 48 and the toe plate from the position of FIG. 1. The two piece ring mold is provided with a pair of injection sprews (not shown). It is prefered to use polyvinylchloride to form the lower and therefor one sprew may be adapted for the injection of white PVC with the other being used for the injection of amber PVC. As discussed, the white material is initially injected and after a predetermined cooling period the amber material is subsequently injected. While not shown in the figures, cooling of the resinous material is accomplished by the provision of chiller plates which may be located beneath the sole plate 16.

The resins which are injected into the mold cavity and form the shoe bottom together with the foxing or side wall that joins the shoe lower to the shoe upper is generally at a temperature from about 375° to 400° F. This material begins to jell when its temperature has been reduced to approximately 150 to 200° F.

Due to the presence of the electric heating element 32 the last, during the injection period, is capable of attaining a temperature of from approximately 215° to 230° F. This temperature is required for the side wall or foxing to completely penetrate into the shoe upper thereby to connect the upper to the shoe lower. While this temperature must be maintained at the foxing region of the last the equivalent temperature in the bottom region of the last is excessive in the practice of high speed injection molding techniques. Thus, the temperature at the last bottom necessitates an increase in time between injections, a longer cooling period, so that the injected resin has an opportunity to jell. It has been found that an excessively high temperature in the bottom region of the last is not required to obtain proper lamination of the resins being used and by means of the heat insulation sheet 40 the bottom region of the last is maintained at a temperature of from approximately 20° to 30° F. below that of the upper portion 34. Thus, due to the reduction in temperature at the bottom section 36 of the last the resin cools at a significantly faster rate and the time spent between the series of operations is reduced by a factor of approximately 25%. The use of the improved shoe last not only allows the machine to be increased in speed between the various stations but by the significant reduction in temperature obtained by the use of the insulating sheet the problem with regard to the intermingling rather than the junction lamination of resins is obviated.

From the foregoing it is apparent that the objects of the invention are carried out and the advantages are apparent. While the foregoing discussion has been directed to a preferred embodiment of the present invention this discussion is not meant to limit the invention to the disclosed embodiment for clearly modifications may be made which are within the bounds of the invention as defined by the appended claims.

Having described the invention I claim:

1. In the combination with a molding machine for use in fabricating a shoe lower and joining it to a shoe upper wherein there is provided a mold generally including a two-piece side, a sole plate and a toe plate at least some of which are movable into and out of an operative molding position, a movable shoe last having a heating element disposed therein so as to be internally heated thereby, said last being defined by a support form having a toe, heel and ankle portion on which the shoe upper is supportingly received and consequently moved with the last into a cavity formed by the mold when the latter moves to the operative molding position substantially bounding said upper during the molding process whereby the shoe upper is joined to the shoe lower to form a finished product, and means in the form of an insulating sheet disposed within said last and positioned between the heating element and the bottom surface of the last thereby to isolate the element from the last bottom and divide the last into an upper section and a lower section, said lower section being maintained at a temperature which is substantially lower than the temperature attained by the upper section.

2. The combination as defined by claim 1 wherein said heating element is arranged to heat the last upper section to a temperature of from about 215° to 230° F. and said insulating sheet is arranged to maintain the last bottom section at a temperature of at least substantially 20° F. lower.

3. A shoe last for use with a molding machine for fabricating a shoe lower and joining it to a shoe upper having mold structure including a two-piece side, a sole plate and a toe plate at least some of which are adapted for movement into a molding position to define a cavity, said last defined by a support including a heel, toe and ankle portion for supportingly receiving said shoe upper, said last and shoe upper being adapted for movement into said cavity substantially bounded by said mold at the inception of the molding process during which time said shoe lower is fabricated, a heating element contained within said shoe last and generally traversing the portion between said heel and toe for providing the necessary heat required to join said shoe upper and lower, and insulation means in the form of a sheet of heat insulating material disposed within said last and positioned between said element and said last bottom thereby to divide the last into an upper and lower section and maintain said last lower at a temperature substantially below the temperature of said last upper.

4. The shoe last as defined in claim 3 wherein said heating element is arranged to heat the last upper section to a temperature of from about 215° to 230° F. and said insulating sheet is arranged to maintain the last bottom section at a temperature of at least substantially 20° F. lower.

References Cited

UNITED STATES PATENTS

| | | | |
|---|---|---|---|
| 2,168,243 | 8/1939 | Rollmann | 18—175 X |
| 2,406,359 | 8/1946 | Doherty | 18—34 |
| 2,878,523 | 3/1959 | Hardy | 18—175 X |
| 3,128,505 | 4/1964 | Ludwig | 18—42 |
| 3,160,921 | 12/1964 | Ludwig | 18—42 |
| 3,199,149 | 8/1965 | Croyle | 18—17 |
| 3,343,223 | 9/1967 | Ludwig | 18—42 |

J. HOWARD FLINT, JR., *Primary Examiner.*